June 14, 1927.  G. A. WATERS  1,632,386

PIN

Filed June 30, 1922

G. A. Waters
INVENTOR

BY Victor J. Evans
ATTORNEY

Patented June 14, 1927.

1,632,386

UNITED STATES PATENT OFFICE.

GEORGE A. WATERS, OF NEWKIRK, OKLAHOMA.

PIN.

Application filed June 30, 1922. Serial No. 571,935.

This invention comprehends the provision of a crank shaft starting pin for Ford automobiles, and aims to provide a pin which is easily installed, very simple in construction so that it can be manufactured and sold at a very nominal cost, and used in a manner to provide an extra support for the fan pulley.

The nature and advantages of the invention will be better understood when the following detailed description is read in connection with the accompanying drawing, the invention residing in the construction, combination, and arrangement of parts as claimed.

In the drawing forming part of this application, like numerals of reference indicate similar parts in the several views, and wherein:—

Figure 1:
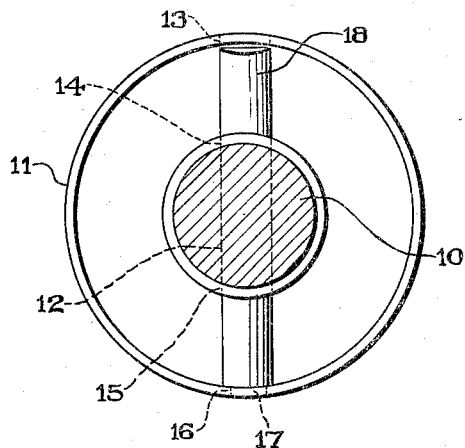
Figure 1 is a view, showing the manner of using the pin.
Figure 2:
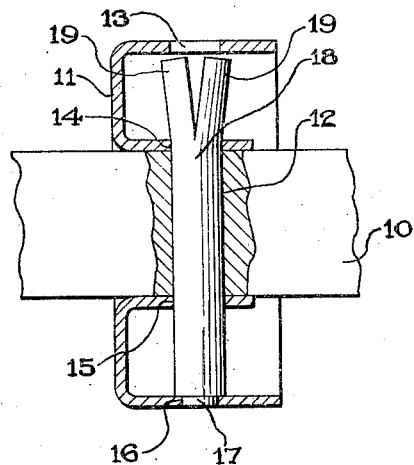
Figure 2 is a detailed view of the pin.

Referring now to the drawing in detail, 10 indicates the crank shaft and 11 the fan belt pulley, the shaft being provided with a transverse bore 12, while the pulley is provided with aligned openings 13, 14 and 15 respectively, all of which are of the same size. This pulley is also provided with an additional smaller opening 16 which receives the reduced end 17 of the pin 18, the latter forming the subject matter of the present invention. As illustrated, the pin is split longitudinally from one end, thus providing yieldable separated portions 19 which prevent casual separation of the pin from the pulley and the crank shaft. The parts can be easily and quickly assembled, it being only necessary to turn the shaft 10 in order to bring the bore 12 thereof in a line with the openings 13, 14 and 15 of the pulley, the pin being subsequently driven through the aligned openings and bore, with the small end 17 initially entering the opening 13. As the pin is thus passed through the parts, the yieldable portions 19 are moved toward each other, until they entirely pass through the opening 13 of the pulley, whereupon they separate and prevent the pin from being casually separated from the parts as above stated. When the pin is in position, the small or reduced end 17 is received by the opening 16, thus giving an extra bearing or support to the pulley. It will be noted that the reduced extremity 17 defines a shoulder which bears against the adjacent surface of the pulley, while the separated portions 19 are arranged to contact with the pulley at a diametrically opposite point and thereby prevent movement of the pin and retain the reduced extremity 17 in the opening 16 at all times as will be readily apparent. It is to be understood that the pin may be constructed from any suitable material and also vary in size without departing from the spirit of the invention. Furthermore, while I have shown and described the pin used in a particular manner, I desire to have it understood that a general application of the invention where a use can be found for the same is contemplated by the claim.

What I claim is:—

The combination of a shaft having a transverse bore, a pulley mounted on the shaft and having inner and outer spaced portions and a plurality of alined openings in registration with said bore, and a pin occupying said openings and bore for holding the pulley on the shaft, said pin having a reduced end portion received by a pulley opening of corresponding reduced size and also having a shoulder bearing against the inner side of the pulley portion in which the reduced end of the pin is disposed, the opposite end of the pin being split longitudinally and defining separated portions arranged within the outer portion of the pulley and adapted to bear outwardly against the latter at diametrically opposite sides of the adjacent opening for the purpose specified.

In testimony whereof I affix my signature.

GEORGE A. WATERS.